US012524029B2

(12) United States Patent
Zhai et al.

(10) Patent No.: US 12,524,029 B2
(45) Date of Patent: Jan. 13, 2026

(54) DIGITAL-ANALOG INTEGRATED VOLTAGE TRANSFORMER CALIBRATION SYSTEM

(71) Applicants: Yunnan Power Grid Co., Ltd. Electric Power Research Institute, Kunming (CN); Chuxiong Power Supply Bureau of Yunnan Power Grid Co., Ltd., Chuxiong (CN)

(72) Inventors: Shaolei Zhai, Kunming (CN); Yutao Yang, Kunming (CN); Xin Shen, Kunming (CN); Ling Wei, Kunming (CN); Junpeng Duan, Kunming (CN); Dezhi Ji, Kunming (CN); Dada Wang, Kunming (CN); Ping Li, Kunming (CN); Linshan Zhang, Kunming (CN); Meiwei Fan, Kunming (CN); Yiwen Liu, Kunming (CN); Lijun Tang, Kunming (CN); Tingjie Ba, Kunming (CN); Jindong Yang, Kunming (CN); Zonghan Jiao, Kunming (CN); Xiran Zhang, Kunming (CN); Yue Zhang, Kunming (CN); Kai Xu, Kunming (CN); Shizhao Chen, Kunming (CN); Qin Gao, Kunming (CN); Xiaoyu Zhao, Kunming (CN); Jingting Lv, Kunming (CN)

(*) Notice: Subject to any disclaimer, the term of this patent is extended or adjusted under 35 U.S.C. 154(b) by 19 days.

(21) Appl. No.: 18/890,694

(22) Filed: Sep. 19, 2024

(65) Prior Publication Data

US 2025/0013254 A1    Jan. 9, 2025

Related U.S. Application Data

(63) Continuation of application No. PCT/CN2023/074926, filed on Feb. 8, 2023.

(51) Int. Cl.
 *G05F 1/46* (2006.01)
 *G06F 1/26* (2006.01)
 *H03M 1/12* (2006.01)

(52) U.S. Cl.
 CPC .............. *G05F 1/46* (2013.01); *G06F 1/26* (2013.01); *H03M 1/12* (2013.01)

(58) Field of Classification Search
 CPC ... G05F 1/26; G05F 1/46; H03M 1/12; G01R 35/02
 See application file for complete search history.

(56) References Cited

U.S. PATENT DOCUMENTS 11,601,309 B1* 3/2023 Rattan ............... H04L 25/03057
2005/0243491 A1* 11/2005 Tanis ..................... H02H 3/046
361/104

(Continued)

FOREIGN PATENT DOCUMENTS

| CN | 101290345 A | 10/2010 |
| CN | 201681152 U | 12/2010 |

(Continued)

*Primary Examiner* — Sibin Chen (57) ABSTRACT

The present disclosure discloses a digital-analog integrated voltage transformer calibration system, used for calibrating a voltage transformer, the system including: a direct-current high voltage generator, having an input terminal connected with an input terminal of a signal conversion module; the signal conversion module, having an input terminal connected with an output terminal of the voltage transformer and an output terminal connected with a digital quantity acquisition module; the digital quantity acquisition module, having an input terminal connected with the output terminal of the voltage transformer and an output terminal connected with a processing module; the processing module, used for receiving a first digital voltage signal, a second digital voltage signal, and a third digital voltage signal.

10 Claims, 5 Drawing Sheets

(56) References Cited

U.S. PATENT DOCUMENTS

| | | | | |
|---|---|---|---|---|
| 2007/0007945 | A1* | 1/2007 | King | G01R 21/133 |
| | | | | 324/76.77 |
| 2013/0191053 | A1 | 7/2013 | Spanier et al. | |
| 2020/0309829 | A1 | 10/2020 | He et al. | |
| 2025/0067830 | A1* | 2/2025 | Patel | G01R 31/52 |

FOREIGN PATENT DOCUMENTS

| | | | |
|---|---|---|---|
| CN | 104833941 | A | 8/2015 |
| CN | 207780218 | U | 8/2018 |
| CN | 110441724 | A | 11/2019 |
| CN | 110488214 | A | 11/2019 |
| CN | 110764041 | A | 2/2020 |
| CN | 111693923 | A | 9/2020 |

* cited by examiner

DIGITAL-ANALOG INTEGRATED VOLTAGE TRANSFORMER CALIBRATION SYSTEM

CROSS-REFERENCE TO RELATED APPLICATIONS

The present application is a continuation-application of International (PCT) Patent Application No. PCT/CN2023/074926, filed on Feb. 8, 2023, the entire contents of which are hereby incorporated by reference in their entirety.

TECHNICAL FIELD

The present disclosure relates to the technical field of calibration of transformers, and in particular to a digital-analog integrated voltage transformer calibration system.

BACKGROUND

A voltage transformer provides accurate and reliable voltage measurement information for control and protection of a converter station. Its operational reliability and measurement accuracy are directly related to operational stability and reliability of the converter station, and thus it is an important link in a direct-current power transmission system. In order to ensure transmission accuracy and transmission characteristics of the voltage transformer, it is necessary to perform a pre-operation test and periodic inspection on the voltage transformer.

A same voltage transformer generally outputs two types of signals, i.e. an analog voltage signal or a digital voltage signal. For calibration of such voltage transformer, three different calibration devices are usually adopted in the prior art for continuous switching to calibrate the voltage transformer. This makes a calibration process relatively complex, and it is impossible to complete calibration with one calibration device, which increases a calibration cost.

SUMMARY

Based on this, it is necessary to propose a digital-analog integrated voltage transformer calibration system aiming to the above problems.

The digital-analog integrated voltage transformer calibration system, used for calibrating a voltage transformer, the system includes:
  a direct-current high voltage generator, where an output terminal is connected with an input terminal of a signal conversion module, to be used for outputting a standard voltage signal to the signal conversion module;
  the signal conversion module, having an input terminal connected with an output terminal of the voltage transformer and an output terminal connected with a digital quantity acquisition module;
  the digital quantity acquisition module, having an input terminal connected with the output terminal of the voltage transformer and an output terminal connected with a processing module, where,
  when the voltage transformer outputs an analog voltage signal, the signal conversion module is used for receiving the analog voltage signal output by the voltage transformer and the standard voltage signal output by the direct-current high voltage generator, converting the analog voltage signal to a second digital voltage signal, converting the standard voltage signal to a third digital voltage signal, and transmitting the second digital voltage signal and the third digital voltage signal to the digital quantity acquisition module; the digital quantity acquisition module is used for receiving the second digital voltage signal and the third digital voltage signal, and transmitting the second digital voltage signal and the third digital voltage signal to the processing module in a form of a message;
  when the voltage transformer outputs a first digital signal, the signal conversion module is used for receiving the standard voltage signal output by the direct-current high voltage generator, converting the standard voltage signal to the third digital voltage signal, and transmitting the third digital voltage signal to the digital quantity acquisition module; and the digital quantity acquisition module is used for receiving the first digital voltage signal output by the voltage transformer and the first digital signal output by the signal conversion module, and transmitting the first digital voltage signal and the third digital voltage signal to the processing module in the form of the message;
  the processing module, used for, when the voltage transformer outputs the analog voltage signal, calibrating the voltage transformer according to the received second digital voltage signal and third digital voltage signal, and for, when the voltage transformer outputs the first digital voltage signal, calibrating the voltage transformer according to the received first digital voltage signal and third digital voltage signal; and
  a synchronization module, having an output terminal connected with the direct-current high voltage generator, the digital quantity acquisition module, and the AD conversion module, and used for outputting a synchronous pulse signal to the direct-current high voltage generator and the digital quantity acquisition module, and outputting a pulse-per-second signal and an IRIG-B time synchronization pulse signal to the direct-current high voltage generator.

In one embodiment, the digital-analog integrated voltage transformer calibration system further includes:
  a signal conditioning module, having an input terminal connected with the output terminal of the voltage transformer and an output terminal connected with an AD conversion module, and used for, when the voltage transformer outputs a secondary power frequency voltage signal, receiving the secondary power frequency voltage signal, converting the secondary power frequency voltage signal to a first voltage signal required by the AD conversion module, and transmitting the first voltage signal to the AD conversion module; and
  the AD conversion module, having an output terminal connected with the input terminal of the digital quantity acquisition module, and used for receiving the first voltage signal, converting the first voltage signal to a fourth digital voltage signal, and transmitting the fourth digital voltage signal to the digital quantity acquisition module, where the digital quantity acquisition module transmits the fourth digital voltage signal to the processing module in the form of the message; and the processing module calibrates the voltage transformer according to the fourth digital voltage signal and the third digital voltage signal.

In one embodiment, the digital quantity acquisition module includes:
  an FT3 receiving module, having an input terminal connected with an output terminal of the signal conversion module and an output terminal connected with an FPGA digital quantity receiving module, and used for receiving the second digital voltage signal and the third digital voltage signal transmitted by the signal conversion module, and transmitting the second digital voltage signal and the third digital voltage signal to the FPGA digital quantity receiving module;

an Ethernet receiving module, having an input terminal connected with the output terminal of the voltage transformer and an output terminal connected with the FPGA digital quantity receiving module, and used for receiving the first digital voltage signal;

the FPGA digital quantity receiving module, having an output terminal connected with a PowerPC data processing module, and used for receiving the second digital voltage signal, the third digital voltage signal, and the first digital voltage signal, and transmitting the first digital voltage signal, the second digital voltage signal, and the third digital voltage signal to the PowerPC data processing module in the form of the message;

the PowerPC data processing module, having an output terminal connected with an input terminal of an Ethernet transmission module, and used for receiving the first digital voltage signal, the second digital voltage signal, and the third digital voltage signal in the form of the message, unpacking the first digital voltage signal, the second digital voltage signal, and the third digital voltage signal in the form of the message, and then transmitting the first digital voltage signal, the second digital voltage signal and the third digital voltage signal to the Ethernet transmission module; and the Ethernet transmission module, having an output terminal connected with an input terminal of the processing module, and used for receiving the unpacked first digital voltage signal, second digital voltage signal, and third digital voltage signal, and transmitting the first digital voltage signal, the second digital voltage signal, and the third digital voltage signal to the processing module.

In one embodiment, the synchronization module includes:

a single processor module, having an output terminal connected with an input terminal of a first pulse output module, an input terminal of a second pulse output module, an input terminal of a pulse-per-second output module, and the input terminal of an IRIG-B time synchronization pulse output module, and used for controlling the first pulse output module and the second pulse output module to output a synchronous pulse signal, and controlling the direct-current high voltage generator to output a pulse-per-second signal and an IRIG-B time synchronization pulse signal;

the first pulse output module, having an output terminal connected with the AD conversion module, and used for transmitting the synchronous pulse signal to the AD conversion module;

the second pulse output module, having an output terminal connected with the digital quantity acquisition module, and used for transmitting the synchronous pulse signal to the AD conversion module;

the pulse-per-second output module, having an output terminal connected with the direct-current high voltage generator, and used for transmitting the pulse-per-second signal to the direct-current high voltage generator; and the IRIG-B time synchronization pulse output module, having an output terminal connected with the direct-current high voltage generator, and used for transmitting the IRIG-B time synchronization pulse signal to the direct-current high voltage generator.

In one embodiment, the digital-analog integrated voltage transformer calibration system further includes:

an oven controlled crystal oscillator module, having an output terminal connected with the single processor module, and used for outputting a crystal oscillator frequency to the single processor module to enable the single processor module to control the first pulse output module and the second pulse output module to output a synchronous pulse signal according to the crystal oscillator frequency, and to control the direct-current high voltage generator to output a pulse-per-second signal and an IRIG-B time synchronization pulse signal.

In one embodiment, the digital-analog integrated voltage transformer calibration system further includes:

a power supply module, having an input terminal connected with mains electricity and an output terminal connected with the digital quantity acquisition module, the AD conversion module, and the synchronization module, and used for supplying power to the digital quantity acquisition module, the AD conversion module, and the synchronization module.

In one embodiment, the signal conditioning module includes: an amplifier, a differential driver, a first resistor, a second resistor, a third resistor, a fourth resistor, and a first capacitor, where, a first gain terminal and a second gain terminal of the amplifier are connected with two terminals of the first resistor separately; a negative input terminal IN− of the amplifier is grounded; a positive input terminal of the amplifier is connected with one terminal of the third resistor, the other terminal of the third resistor is connected with one terminal of the second resistor, and the other terminal of the second resistor is connected with the output terminal of the voltage transformer; a positive power supply terminal and a negative power supply terminal of the amplifier are both connected with the power supply module; an output terminal of the amplifier is connected with a feedback terminal of the differential driver;

the feedback terminal of the differential driver is connected with one terminal of the fourth resistor, and the other terminal of the fourth resistor is connected with a positive output terminal of the differential driver; the first capacitor is connected in parallel with the fourth resistor; a power supply terminal of the differential driver is connected with the power supply module; and a positive output terminal and a negative output terminal of the differential driver are both connected with the AD conversion module.

In one embodiment, the signal conditioning module further includes: a fifth resistor, a second capacitor, and a third capacitor, where, one terminal of the fifth resistor is connected with the output terminal of the amplifier, and the other terminal of the fifth resistor is connected with the feedback terminal of the differential driver;

one terminal of the second capacitor is connected with one terminal, close to the third resistor, of the second resistor, and the other terminal of the second capacitor is grounded; and one terminal of the third capacitor is connected with the positive input terminal of the amplifier, and the other terminal of the third capacitor is grounded.

In one embodiment, the AD conversion module includes: an analog converter.

a positive input terminal of the analog converter is connected with the positive output terminal of the differential driver, and a negative input terminal of the analog converter is connected with the negative output terminal of the differential driver; a power supply terminal and an interface digital power supply terminal of the analog converter are both connected with the power supply module; and a serial data input terminal, a serial data clock input terminal, a serial data output terminal, and a conversion input terminal of the analog converter are all connected with the digital quantity acquisition module.

In one embodiment, the power supply module includes: a first voltage regulation chip, a second voltage regulation chip, a fourth capacitor, a fifth capacitor, a sixth capacitor, and a seventh capacitor, where,

- an input terminal of the first voltage regulation chip is connected with an external power supply, and an output terminal of the first voltage regulation chip is connected with a power supply terminal of the AD conversion module;
- one terminal of the fourth capacitor is connected with the input terminal of the first voltage regulation chip, and the other terminal of the fourth capacitor is connected with a ground terminal of the first voltage regulation chip; one terminal of the fifth capacitor is connected with the output terminal of the first voltage regulation chip, and the other terminal of the fifth capacitor is connected with the ground terminal of the first voltage regulation chip;
- an input terminal of the second voltage regulation chip is connected with the external power supply, and an output terminal of the second voltage regulation chip is connected with a power supply terminal of the digital quantity acquisition module and a power supply terminal of the synchronization module;
- one terminal of the sixth capacitor is connected with the input terminal of the second voltage regulation chip, and the other terminal of the sixth capacitor is connected with the ground terminal of the second voltage regulation chip; and one terminal of the seventh capacitor is connected with the output terminal of the second voltage regulation chip, and the other terminal of the seventh capacitor is connected with the ground terminal of the second voltage regulation chip.

The embodiments of the present disclosure would have the following beneficial effects:

The standard voltage signal is output to the signal conversion module through the direct-current high voltage generator; and meanwhile, the signal conversion module also receives the analog voltage signal output by the voltage transformer, converts the analog voltage signal to the second digital voltage signal, converts the standard voltage signal to the third digital voltage signal, and then transmits the second digital voltage signal and the third digital voltage signal to the digital quantity acquisition module. Meanwhile, the digital quantity acquisition module can also receive the first digital voltage signal transmitted by the voltage transformer, and transmits the first digital voltage signal, the second digital voltage signal, and the third digital voltage signal to the processing module in the form of the message. When the voltage transformer outputs the analog voltage signal, the processing module is used for calibrating the voltage transformer according to the second digital voltage signal and the third digital voltage signal. When the voltage transformer outputs the first digital voltage signal, the processing module is used for calibrating the voltage transformer according to the first digital voltage signal and the third digital voltage signal. During calibration of the voltage transformer, there is no need for replacing the calibration device; and the voltage transformer outputting the analog voltage signal or the first digital voltage signal can be calibrated, only needing one digital-analog integrated voltage transformer calibration system of the present disclosure, which simplifies the calibration process and lowers the calibration cost. Meanwhile, under the action of the synchronization module, the direct-current high voltage generator, the digital quantity acquisition module, and the AD conversion module can work synchronously, which provides work efficiency.

BRIEF DESCRIPTION OF DRAWINGS

In order to describe the technical solutions in the embodiments of the present disclosure or in the prior art more clearly, the drawings that need to be used in the description of the embodiments or the prior art are briefly introduced below. Apparently, the drawings in the description below show merely some embodiments of the present disclosure, and those of ordinary skill in the art may also acquire other drawings based on these drawings without any creative efforts.

In the drawings.

DETAILED DESCRIPTION OF THE EMBODIMENTS

The technical solutions in the embodiments of the present disclosure are described clearly and completely below in combination with the drawings in the embodiments of the present disclosure. Apparently, the described embodiments are merely a part of the embodiments of the present disclosure, rather than all of the embodiments. On the basis of the embodiments in the present disclosure, all other embodiments acquired by those of ordinary skill in the art without creative efforts fall within a protection scope of the present disclosure.

Figure 1:
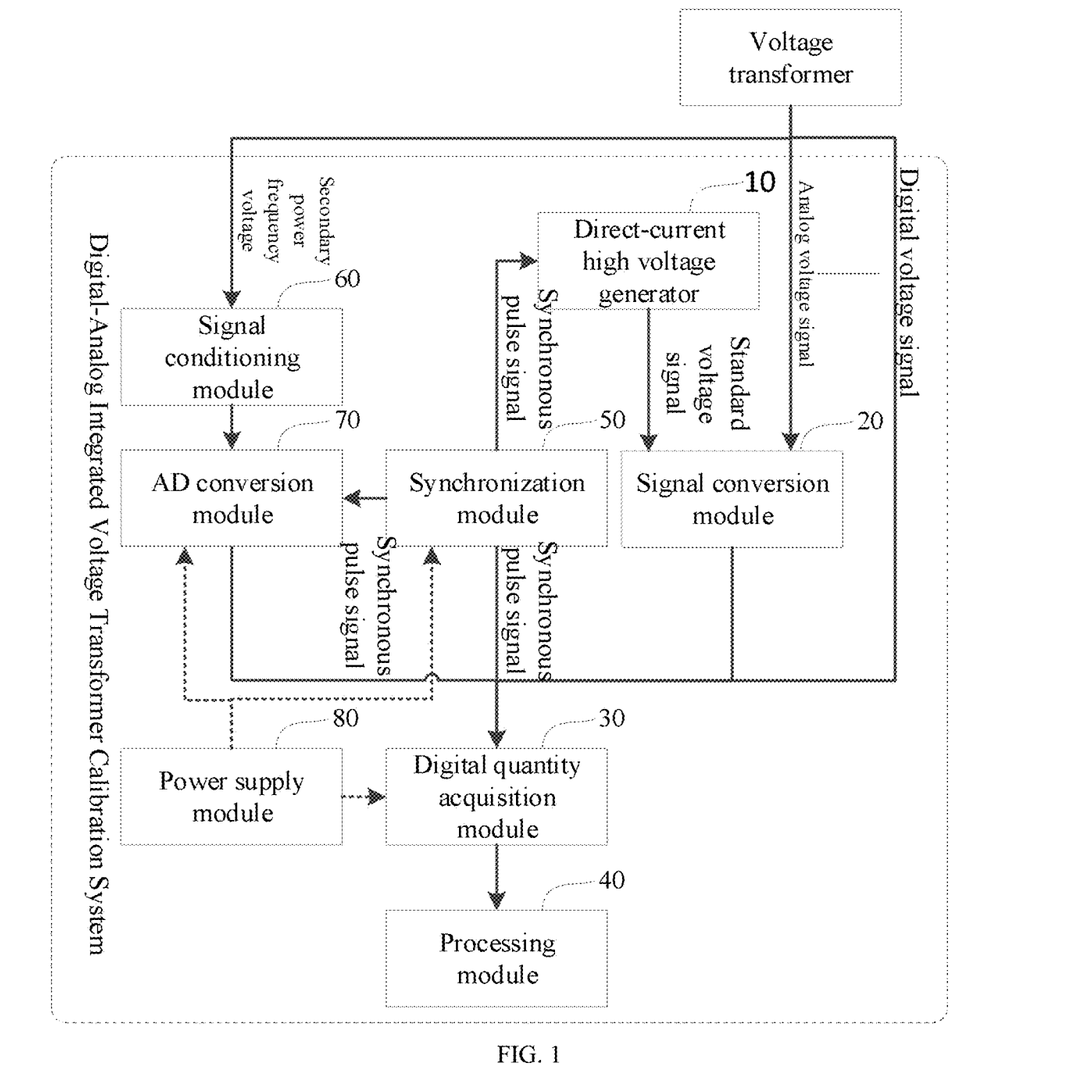
FIG. 1 is a structural block diagram of a digital-analog integrated voltage transformer calibration system in one embodiment.

A voltage transformer provides accurate and reliable voltage measurement information for control and protection of a converter station. Its operational reliability and measurement accuracy are directly related to operational stability and reliability of the converter station, and thus it is an important link in a direct-current power transmission system. In order to ensure transmission accuracy and transmission characteristics of the voltage transformer, it is necessary to perform a pre-operation test and periodic inspection on the voltage transformer. A same voltage transformer generally outputs two types of signals, i.e. an analog voltage signal or a digital voltage signal. For calibration of such voltage transformer, three different calibration devices are usually adopted in the prior art for continuous switching to calibrate the voltage transformer. This makes a calibration process relatively complex, and it is impossible to complete calibration with one calibration device, which increases a calibration cost. In order to solve the above technical problems, the present disclosure provides a digital-analog integrated voltage transformer calibration system, used for calibrating a voltage transformer, as shown in FIG. 1, the system including: a direct-current high voltage generator 10, a signal conversion module 20, a digital quantity acquisition module 30, a processing module 40, and a synchronization module 50, where the direct-current high voltage generator 10 has an output terminal connected with an input terminal of the signal conversion module 20, to be used for outputting a standard voltage signal to the signal conversion module 20; the signal conversion module 20 has an input terminal connected with an output terminal of the voltage transformer and an output terminal connected with the digital quantity acquisition module 30; and the digital quantity acquisition module 30 has an input terminal connected with the output terminal of the voltage transformer and an output terminal connected with the processing module 40. When the voltage transformer outputs the analog voltage signal, the signal conversion module 20 is used for receiving the analog voltage signal output by the voltage transformer and the standard voltage signal output by the direct-current high voltage generator 10, converting the analog voltage signal to the second digital voltage signal, converting the standard voltage signal to the third digital voltage signal, and transmitting the second digital voltage signal and the third digital voltage signal to the digital quantity acquisition module 30; and the digital quantity acquisition module 30 is used for receiving the second digital voltage signal and the third digital voltage signal, and transmitting the second digital voltage signal and the third digital voltage signal to the processing module 40 in the form of the message. When the voltage transformer outputs a first digital signal, the signal conversion module 20 is used for receiving the standard voltage signal output by the direct-current high voltage generator 10, converting the standard voltage signal to the third digital voltage signal, and transmitting the third digital voltage signal to the digital quantity acquisition module 30; and the digital quantity acquisition module 30 is used for receiving the first digital voltage signal output by the voltage transformer and the first digital signal output by the signal conversion module 20, and transmitting the first digital voltage signal and the third digital voltage signal to the processing module 40 in the form of the message. The processing module 40 is used for, when the voltage transformer outputs the analog voltage signal, calibrating the voltage transformer according to the received second digital voltage signal and third digital voltage signal, and for, when the voltage transformer outputs the first digital voltage signal, calibrating the voltage transformer according to the received first digital voltage signal and third digital voltage signal. The synchronization module 50 has an output terminal connected with the direct-current high voltage generator 10, the digital quantity acquisition module 30, and the AD conversion module 70, and is used for outputting the synchronous pulse signal to the direct-current high voltage generator 10 and the digital quantity acquisition module 30, and outputting a pulse-per-second signal and an IRIG-B time synchronization pulse signal to the direct-current high voltage generator 10. During calibration of the voltage transformer, there is no need for replacing a calibration device, and a voltage transformer outputting an analog voltage signal or the first digital voltage signal can be calibrated, only needing one digital-analog integrated voltage transformer calibration system of the present disclosure, which simplifies a calibration process, and lowers a calibration cost. Meanwhile, under the action of the synchronization module, the direct-current high voltage generator, the digital quantity acquisition module, and the AD conversion module can work synchronously, which provides work efficiency.

In one embodiment, the digital-analog integrated voltage transformer calibration system further includes: a signal conditioning module 60 and an AD conversion module 70. In this embodiment, the signal conditioning module 60 has an input terminal connected with the output terminal of the voltage transformer and an output terminal connected with the AD conversion module 70, and is used for, when the voltage transformer outputs a secondary power frequency voltage signal, receiving the secondary power frequency voltage signal, converting the secondary power frequency voltage signal to a first voltage signal required by the AD conversion module 70, and transmitting the first voltage signal to the AD conversion module 70; and the AD conversion module 70 has an output terminal connected with the input terminal of the digital quantity acquisition module 30, and is used for receiving the first voltage signal, converting the first voltage signal to a fourth digital voltage signal, and transmitting the fourth digital voltage signal to the digital quantity acquisition module 30, where the digital quantity acquisition module 30 transmits the fourth digital voltage signal to the processing module 40 in the form of the message; and the processing module 40 calibrates the voltage transformer according to the fourth digital voltage signal and the third digital voltage signal.

Figure 2:
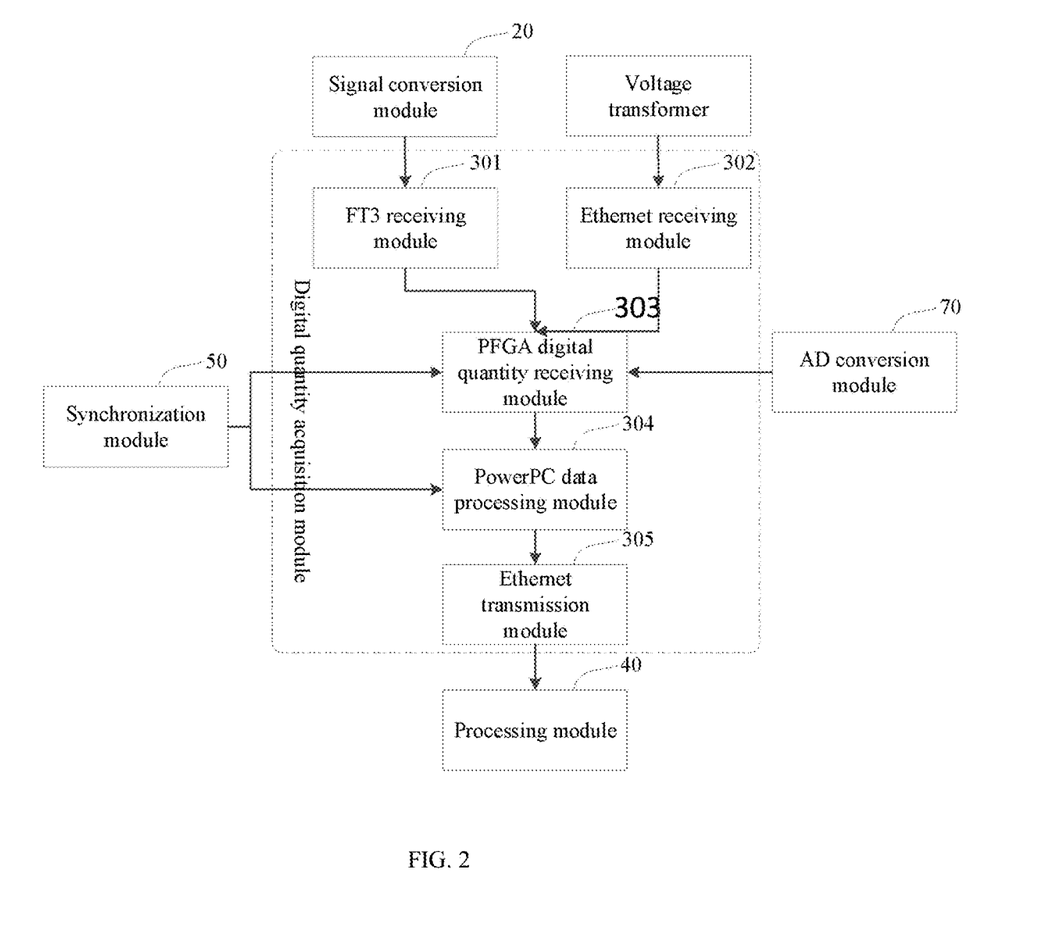
FIG. 2 is a structural block diagram of a digital quantity acquisition module in one embodiment.

In one embodiment, as shown in FIG. 2, the digital quantity acquisition module 30 includes: an FT3 receiving module 301, an Ethernet receiving module 302, an FPGA digital quantity acquisition module 303, a PowerPC data processing module 304, and an Ethernet transmission module 305, where the FT3 receiving module 301 has an input terminal connected with an output terminal of the signal conversion module 20 and an output terminal connected with the FPGA digital quantity receiving module 303, and is used for receiving the second digital voltage signal and the third digital voltage signal transmitted by the signal conversion module 20, and transmitting the second digital voltage signal and the third digital voltage signal to the FPGA digital quantity receiving module 303; the Ethernet receiving module 302 has an input terminal connected with the output terminal of the voltage transformer and an output terminal connected with the FPGA digital quantity receiving module 303, and is used for receiving the first digital voltage signal; the FPGA digital quantity receiving module 303 has an output terminal connected with the PowerPC data processing module 304, and is used for receiving the second digital voltage signal, the third digital voltage signal, and the first digital voltage signal, and transmitting the first digital voltage signal, the second digital voltage signal, and the third digital voltage signal to the PowerPC data processing module 304 in the form of the message; the PowerPC data processing module 304 has an output terminal connected with an input terminal of the Ethernet transmission module 305, and is used for receiving the first digital voltage signal, the second digital voltage signal, and the third digital voltage signal in the form of the message, unpacking the first digital voltage signal, the second digital voltage signal, and the third digital voltage signal in the form of the message, and then transmitting them to the Ethernet transmission module 305; and the Ethernet transmission module 305 has an output terminal connected with an input terminal of the processing module 40, and is used for receiving the unpacked first digital voltage signal, second digital voltage signal, and third digital voltage signal, and transmitting the first digital voltage signal, the second digital voltage signal, and the third digital voltage signal to the processing module 40. In this embodiment, the processing module 40 may be a host computer or other devices capable of achieving the function. It uses the characteristics of a friendly interface and a strong data processing ability to develop application layer software by C language programming, completes communication with the digital quantity acquisition module 30 through Ethernet communication, and performs test work after sample value data is received. The FPGA digital quantity receiving module 303 selected is an XC3S1000 device in a Xilinx Spartan3 series. The chip is an ultra-large-scale programmable logic chip based on an SRAM process, providing rich interface resources such as up to 1 million equivalent system gates, 432 Kbit block SRAM and 24 18*18 multipliers, and 175 pairs of differential I/O. A Spartan-3 device supports 24 major I/O standards, including PCI 32/33 and PCI 64/33, as well as other parallel connection functional kernels commonly used in the telecommunication and network fields. The FPGA digital quantity receiving module 303 mainly achieves FT3 data adaptive reception with different transmission rates and different data protocols. According to the requirements of IEC60044-8 protocol, adopted sampling value output of an optical voltage transformer is high-rate serial FT3 output. In order to ensure stability of power consumption during data transmission, a Manchester coding form is adopted in FT3 data transmission. A Data time series is tracked according to the Manchester coding form. First, a baud rate of FT3 data transmission is pre-judged; and second, an actual FT3 transmission rate is finally determined in combination with stability detection. According to a transmission rate judgment result, an FPGA automatically adjusts receiving parameters, and decodes and performs a CRC test on received coded data. According to a length of a data set in a sampling data area, it is distinguished to be a standard FT3 protocol or a national grid FT3 protocol, so as to receive FT3 sampling data with different transmission rates and different application standard protocols.

Figure 3:
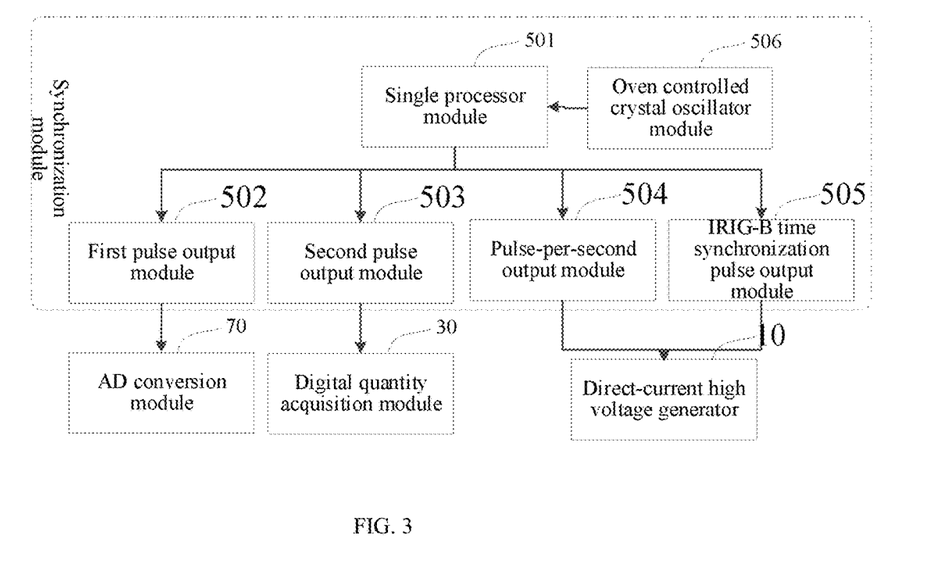
FIG. 3 is a structural block diagram of a synchronization module in one embodiment.

In one embodiment, as shown in FIG. 3, the synchronization module 50 includes: a single processor module 501, a first pulse output module 502, a second pulse output module 503, a pulse-per-second output module 504, an IRIG-B time synchronization pulse output module 505, and an oven controlled crystal oscillator module 506, where the single processor module 501 has an output terminal connected with an input terminal of the first pulse output module 502, an input terminal of the second pulse output module 503, an input terminal of the pulse-per-second output module 504, and the input terminal of the IRIG-B time synchronization pulse output module 505, and is used for controlling the first pulse output module 502 and the second pulse output module 503 to output a synchronous pulse signal, and controlling the direct-current high voltage generator 10 to output a pulse-per-second signal and an IRIG-B time synchronization pulse signal; the first pulse output module 502 has an output terminal connected with the AD conversion module 70, and is used for transmitting the synchronous pulse signal to the AD conversion module 70; the second pulse output module 503 has an output terminal connected with the digital quantity acquisition module 30, and is used for transmitting the synchronous pulse signal to the AD conversion module 70; the pulse-per-second output module 504 has an output terminal connected with the direct-current high voltage generator 10, and is used for transmitting the pulse-per-second signal to the direct-current high voltage generator 10; the IRIG-B time synchronization pulse output module 505 has an output terminal connected with the direct-current high voltage generator 10, and is used for transmitting the IRIG-B time synchronization pulse signal to the direct-current high voltage generator 10; and the oven controlled crystal oscillator module 506 has an output terminal connected with the single processor module 501, and is used for outputting a crystal oscillator frequency to the single processor module 501 to enable the single processor module 501 to control the first pulse output module 502 and the second pulse output module 503 to output a synchronous pulse signal according to the crystal oscillator frequency, and to control the direct-current high voltage generator 10 to output a pulse-per-second signal and an IRIG-B time synchronization pulse signal. In this embodiment, the single processor module 501 adopted is a single processor of a model of CPLD-XC95288XL, which mainly completes reception and processing of IEEE1588 and IRIG-B code messages, and can accurately control output of a 1 PPS pulse-per-second signal and an IRIG-B time synchronization optical pulse signal. The single processor module 501 monitors the 1 PPS pulse-per-second signal and the B-code timing optical pulse signal in real time, and automatically identifies signal types according to high and low level widths of a synchronous optical pulse signal. When the single processor module 501 cannot detect the effective 1 PPS pulse-per-second signal and IRIG-B time synchronization optical pulse signal from a GPS clock source of the oven controlled crystal oscillator module 506, whether there is a network clock source, i.e. an IEEE1588 timing service, is further detected. If there is no stable network timing service, the single processor module 501 relies on its own high-precision crystal oscillator to generate a standard 1 PPS pulse-per-second signal.

In one embodiment, as shown in FIG. 1, the digital-analog integrated voltage transformer calibration system further includes: a power supply module 80, where the power supply module 80 has an input terminal connected with mains electricity and an output terminal connected with the digital quantity acquisition module 30, the AD conversion module 70, and the synchronization module 50, and is used for supplying power to the digital quantity acquisition module 30, the AD conversion module 70, and the synchronization module 50.

Figure 4:
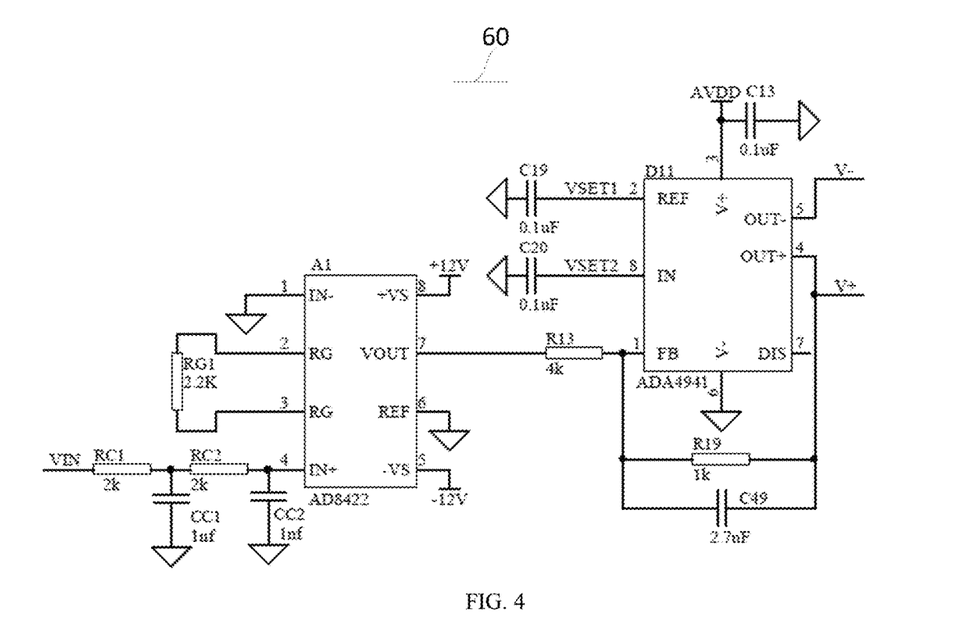
FIG. 4 is a circuit diagram of a signal conditioning module in one embodiment.

In one embodiment, as shown in FIG. 4, the signal conditioning module 60 includes: an amplifier A1, a differential driver D11, a first resistor RG1, a second resistor RC1, a third resistor RC2, a fourth resistor R19, and a first capacitor C49, where the amplifier A1 is of a model of AD8422, and the differential driver D11 is of a model of ADA4941; a first gain terminal and a second gain terminal of the amplifier A1 are connected with two terminals of the first resistor RG1 separately; a negative input terminal IN− of the amplifier A1 is grounded; a positive input terminal IN+ of the amplifier A1 is connected with one terminal of the third resistor RC2, the other terminal of the third resistor RC2 is connected with one terminal of the second resistor RC1, and the other terminal of the second resistor RC1 is connected with the output terminal of the voltage transformer; a positive power supply terminal +VS and a negative power supply terminal-VS of the amplifier A1 are both connected with the power supply module 80; an output terminal VOUT of the amplifier A1 is connected with a feedback terminal FB of the differential driver D11; the feedback terminal FB of the differential driver D11 is connected with one terminal of the fourth resistor R19, and the other terminal of the fourth resistor R19 is connected with a positive output terminal OUT+ of the differential driver D11; the first capacitor C49 is connected in parallel with the fourth resistor R19; a power supply terminal AVDD of the differential driver D11 is connected with the power supply module 50; and a positive output terminal OUT+ and a negative output terminal OUT− of the differential driver D11 are both connected with the AD conversion module 70.

In one embodiment, as shown in FIG. 4, the signal conditioning module 60 further includes: a fifth resistor R13, a second capacitor CC1, and a third capacitor CC2, where one terminal of the fifth resistor R13 is connected with the output terminal VOUT of the amplifier A1, and the other terminal of the fifth resistor R13 is connected with the feedback terminal FB of the differential driver D11; one terminal of the second capacitor CC1 is connected with one terminal, close to the third resistor RC2, of the second resistor RC1, and the other terminal of the second capacitor CC1 is grounded; and one terminal of the third capacitor CC2 is connected with the positive input terminal IN+ of the amplifier A1, and the other terminal of the third capacitor CC2 is grounded.

Figure 5:
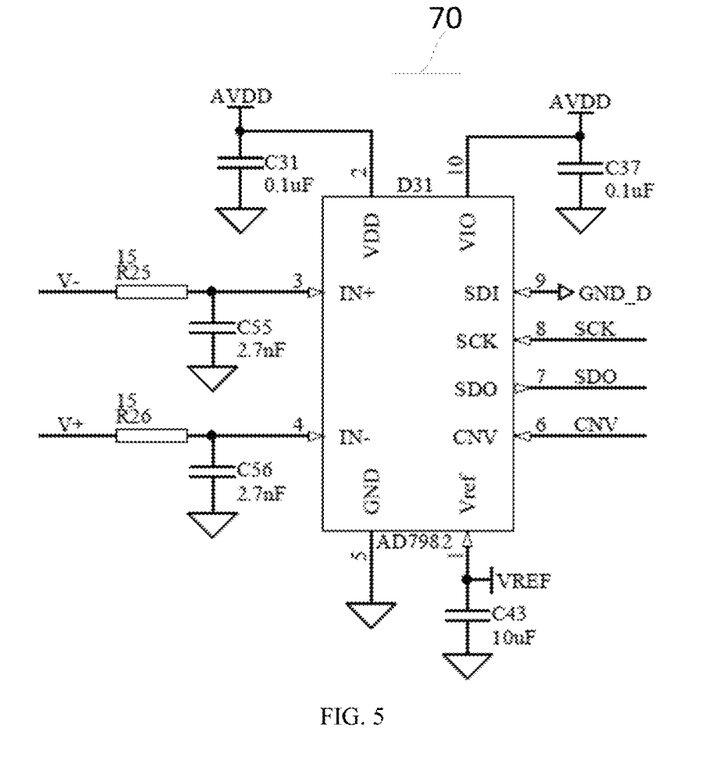
FIG. 5 is a circuit diagram of an AD conversion module in one embodiment.

In one embodiment, as shown in FIG. 5, the AD conversion module 70 includes: an analog converter D31, where the analog converter D31 is of a model of AD7982; a positive input terminal IN+ of the analog converter D31 is connected with the positive output terminal OUT+ of the differential driver D11, and a negative input terminal IN− of the analog converter D31 is connected with the negative output terminal OUT− of the differential driver D11; a power supply terminal VDD and an interface digital power supply terminal VIO of the analog converter D31 are both connected with the power supply module 80; and a serial data input terminal SDI, a serial data clock input terminal SCK, a serial data output terminal SDO, and a conversion input terminal CNV of the analog converter D31 are all connected with the digital quantity acquisition module 30. The analog converter D31 is an 18-bit successive approximation analog-to-digital converter of a model of AD7982, having a sampling rate of up to 1000 kSPS, and being capable of achieving a high-precision analog-to-digital conversion function at a high sampling rate. The analog converter D31 is powered by a 2.5V single power supply, with a low-power, high-speed, and 18-bit no-code-missing sampling ADC, an internal conversion clock, and a multi-function serial interface port built-in. At a rising edge of a conversion signal, the device samples a voltage difference between differential input pins. A reference voltage is provided externally, and may be set as a power supply voltage. A linear relationship is shown between a power consumption and a throughput rate of the device. It supports an communication mode and a daisy chain connection mode, and provides an optional busy indication.

Figure 6:
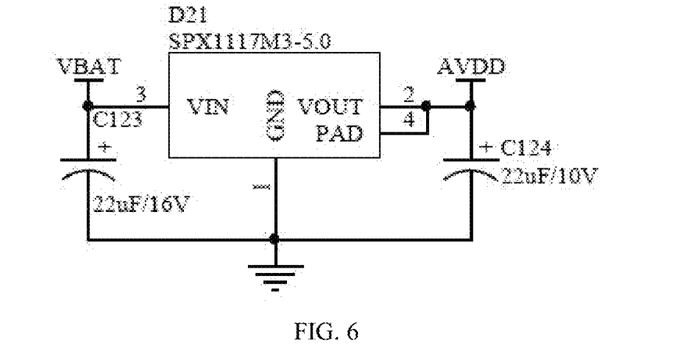
FIG. 6 is a part of a circuit diagram of a power supply module in one embodiment.
Figure 7:
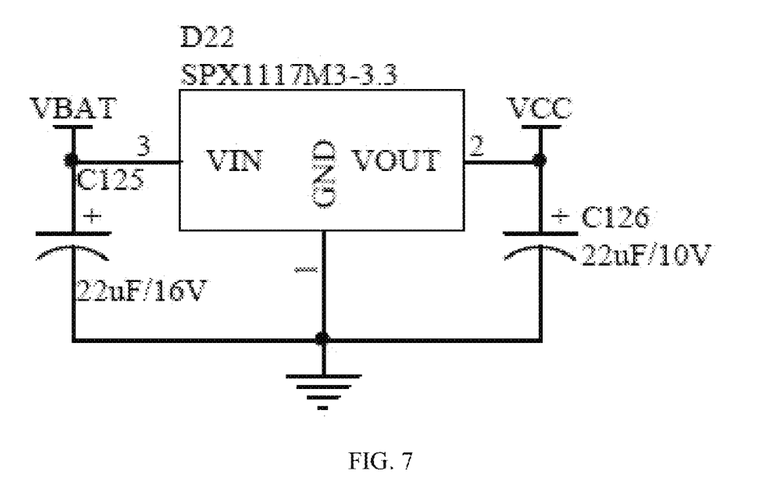
FIG. 7 is another part of the circuit diagram of the power supply module in one embodiment.

In one embodiment, as shown in FIG. 6 and FIG. 7, the power supply module 50 includes: a first voltage regulation chip D21, a second voltage regulation chip D22, a fourth capacitor C123, a fifth capacitor C124, a sixth capacitor C125, and a seventh capacitor C126, where the first voltage regulation chip D21 and the second voltage regulation chip D22 are both of a model of SPX1117M3; an input terminal VIN of the first voltage regulation chip D21 is connected with an external power supply, and an output terminal VOUT of the first voltage regulation chip D21 is connected with a power supply terminal of the AD conversion module 70; one terminal of the fourth capacitor C123 is connected with the input terminal VIN of the first voltage regulation chip D21, and the other terminal of the fourth capacitor C123 is connected with a ground terminal GND of the first voltage regulation chip D21; one terminal of the fifth capacitor C124 is connected with the output terminal VOUT of the first voltage regulation chip D21, and the other terminal of the fifth capacitor C124 is connected with the ground terminal GND of the first voltage regulation chip D21; an input terminal VIN of the second voltage regulation chip D22 is connected with the external power supply, and an output terminal VOUT of the second voltage regulation chip D22 is connected with a power supply terminal of the digital quantity acquisition module 30 and a power supply terminal of the synchronization module 50; one terminal of the sixth capacitor C125 is connected with the input terminal VIN of the second voltage regulation chip D22, and the other terminal of the sixth capacitor C125 is connected with the ground terminal GND of the second voltage regulation chip D22; and one terminal of the seventh capacitor C126 is connected with the output terminal VOUT of the second voltage regulation chip D22, and the other terminal of the seventh capacitor C126 is connected with the ground terminal GND of the second voltage regulation chip D22.

In the present disclosure, during calibration of the voltage transformer, there is no need for replacing a calibration device, and the voltage transformer outputting the analog voltage signal or the first digital voltage signal can be calibrated, only needing one digital-analog integrated voltage transformer calibration system of the present disclosure, which simplifies a calibration process, and lowers a calibration cost. Meanwhile, under the action of the synchronization module, the direct-current high voltage generator, the digital quantity acquisition module, and AD conversion module can work synchronously, which provides work efficiency.

Various technical features of the above embodiments can be arbitrarily combined. For brevity of description, all possible combinations of various technical features in the above embodiments are not described. However, as long as there is no contradiction between the combinations of these technical features, they should all be considered as a scope recited in this specification.

The embodiments described above represent only several implementation modes of the present disclosure, and the description is specific and detailed, but should not be construed as limiting the scope of present disclosure accordingly. It should be pointed out that those of ordinary skill in the art can also make several changes and improvements without departing from the concept of the present disclosure, and these changes and improvements all fall within the scope of protection of the present disclosure. Therefore, the scope of protection of the present disclosure should be subject to the appended claims.

What is claimed is:

1. A digital-analog integrated voltage transformer calibration system, used for calibrating a voltage transformer, the system comprising:

a direct-current high voltage generator, wherein an output terminal is connected with an input terminal of a signal conversion module, to be used for outputting a standard voltage signal to the signal conversion module;

the signal conversion module, having an input terminal connected with an output terminal of the voltage transformer and an output terminal connected with a digital quantity acquisition module;

the digital quantity acquisition module, having an input terminal connected with the output terminal of the voltage transformer and an output terminal connected with a processing module, wherein, when the voltage transformer outputs an analog voltage signal, the signal conversion module is used for receiving the analog voltage signal output by the voltage transformer and the standard voltage signal output by the direct-current high voltage generator, converting the analog voltage signal to a second digital voltage signal, converting the standard voltage signal to a third digital voltage signal, and transmitting the second digital voltage signal and the third digital voltage signal to the digital quantity acquisition module; the digital quantity acquisition module is used for receiving the second digital voltage signal and the third digital voltage signal, and transmitting the second digital voltage signal and the third digital voltage signal to the processing module in a form of a message;

when the voltage transformer outputs a first digital signal, the signal conversion module is used for receiving the standard voltage signal output by the direct-current high voltage generator, converting the standard voltage signal to the third digital voltage signal, and transmitting the third digital voltage signal to the digital quantity acquisition module; and the digital quantity acquisition module is used for receiving the first digital voltage signal output by the voltage transformer and the third digital signal output by the signal conversion module, and transmitting the first digital voltage signal and the third digital voltage signal to the processing module in the form of the message;

the processing module, used for, when the voltage transformer outputs the analog voltage signal, calibrating the voltage transformer according to the received second digital voltage signal and third digital voltage signal, and for, when the voltage transformer outputs the first digital voltage signal, calibrating the voltage transformer according to the received first digital voltage signal and third digital voltage signal; and a synchronization module, having an output terminal connected with the direct-current high voltage generator, the digital quantity acquisition module, and the AD conversion module, and used for outputting a synchronous pulse signal to the direct-current high voltage generator and the digital quantity acquisition module, and outputting a pulse-per-second signal and an IRIG-B time synchronization pulse signal to the direct-current high voltage generator.

2. The digital-analog integrated voltage transformer calibration system according to claim 1, further comprising:

a signal conditioning module, having an input terminal connected with the output terminal of the voltage transformer and an output terminal connected with an AD conversion module, and used for, when the voltage transformer outputs a secondary power frequency voltage signal, receiving the secondary power frequency voltage signal, converting the secondary power frequency voltage signal to a first voltage signal required by the AD conversion module, and transmitting the first voltage signal to the AD conversion module; and the AD conversion module, having an output terminal connected with the input terminal of the digital quantity acquisition module, and used for receiving the first voltage signal, converting the first voltage signal to a fourth digital voltage signal, and transmitting the fourth digital voltage signal to the digital quantity acquisition module, wherein the digital quantity acquisition module transmits the fourth digital voltage signal to the processing module in the form of the message; and the processing module calibrates the voltage transformer according to the fourth digital voltage signal and the third digital voltage signal.

3. The digital-analog integrated voltage transformer calibration system according to claim 2, wherein, the digital quantity acquisition module comprises:

an FT3 receiving module, having an input terminal connected with an output terminal of the signal conversion module and an output terminal connected with an FPGA digital quantity receiving module, and used for receiving the second digital voltage signal and the third digital voltage signal transmitted by the signal conversion module, and transmitting the second digital voltage signal and the third digital voltage signal to the FPGA digital quantity receiving module;

an Ethernet receiving module, having an input terminal connected with the output terminal of the voltage transformer and an output terminal connected with the FPGA digital quantity receiving module, and used for receiving the first digital voltage signal;

the FPGA digital quantity receiving module, having an output terminal connected with a PowerPC data processing module, and used for receiving the second digital voltage signal, the third digital voltage signal, and the first digital voltage signal, and transmitting the first digital voltage signal, the second digital voltage signal, and the third digital voltage signal to the PowerPC data processing module in the form of the message;

the PowerPC data processing module, having an output terminal connected with an input terminal of an Ethernet transmission module, and used for receiving the first digital voltage signal, the second digital voltage signal, and the third digital voltage signal in the form of the message, unpacking the first digital voltage signal, the second digital voltage signal, and the third digital voltage signal in the form of the message, and then transmitting the first digital voltage signal, the second digital voltage signal and the third digital voltage signal to the Ethernet transmission module; and the Ethernet transmission module, having an output terminal connected with an input terminal of the processing module, and used for receiving the unpacked first digital voltage signal, second digital voltage signal, and third digital voltage signal, and transmitting the first digital voltage signal, the second digital voltage signal, and the third digital voltage signal to the processing module.

4. The digital-analog integrated voltage transformer calibration system according to claim 2, further comprising:

a power supply module, having an input terminal connected with mains electricity and an output terminal connected with the digital quantity acquisition module, the AD conversion module, and the synchronization module, and used for supplying power to the digital quantity acquisition module, the AD conversion module, and the synchronization module.

5. The digital-analog integrated voltage transformer calibration system according to claim 4, wherein the signal conditioning module comprises: an amplifier, a differential driver, a first resistor, a second resistor, a third resistor, a fourth resistor, and a first capacitor, wherein, a first gain terminal and a second gain terminal of the amplifier are connected with two terminals of the first resistor separately; a negative input terminal IN− of the amplifier is grounded; a positive input terminal of the amplifier is connected with one terminal of the third resistor, the other terminal of the third resistor is connected with one terminal of the second resistor, and the other terminal of the second resistor is connected with the output terminal of the voltage transformer; a positive power supply terminal and a negative power supply terminal of the amplifier are both connected with the power supply module; an output terminal of the amplifier is connected with a feedback terminal of the differential driver;

the feedback terminal of the differential driver is connected with one terminal of the fourth resistor, and the other terminal of the fourth resistor is connected with a positive output terminal of the differential driver; the first capacitor is connected in parallel with the fourth resistor; a power supply terminal of the differential driver is connected with the power supply module; and a positive output terminal and a negative output terminal of the differential driver are both connected with the AD conversion module.

6. The digital-analog integrated voltage transformer calibration system according to claim 5, wherein the signal conditioning module further comprises: a fifth resistor, a second capacitor, and a third capacitor, wherein, one terminal of the fifth resistor is connected with the output terminal of the amplifier, and the other terminal of the fifth resistor is connected with the feedback terminal of the differential driver;

one terminal of the second capacitor is connected with one terminal, close to the third resistor, of the second resistor, and the other terminal of the second capacitor is grounded; and one terminal of the third capacitor is connected with the positive input terminal of the amplifier, and the other terminal of the third capacitor is grounded.

7. The digital-analog integrated voltage transformer calibration system according to claim 6, wherein the AD conversion module comprises: an analog converter, wherein, a positive input terminal of the analog converter is connected with the positive output terminal of the differential driver, and a negative input terminal of the analog converter is connected with the negative output terminal of the differential driver; a power supply terminal and an interface digital power supply terminal of the analog converter are both connected with the power supply module; and a serial data input terminal, a serial data clock input terminal, a serial data output terminal, and a conversion input terminal of the analog converter are all connected with the digital quantity acquisition module.

8. The digital-analog integrated voltage transformer calibration system according to claim 4, wherein the power supply module comprises: a first voltage regulation chip, a second voltage regulation chip, a fourth capacitor, a fifth capacitor, a sixth capacitor, and a seventh capacitor, wherein, an input terminal of the first voltage regulation chip is connected with an external power supply, and an output terminal of the first voltage regulation chip is connected with a power supply terminal of the AD conversion module;

one terminal of the fourth capacitor is connected with the input terminal of the first voltage regulation chip, and the other terminal of the fourth capacitor is connected with a ground terminal of the first voltage regulation chip; one terminal of the fifth capacitor is connected with the output terminal of the first voltage regulation chip, and the other terminal of the fifth capacitor is connected with the ground terminal of the first voltage regulation chip;

an input terminal of the second voltage regulation chip is connected with the external power supply, and an output terminal of the second voltage regulation chip is connected with a power supply terminal of the digital quantity acquisition module and a power supply terminal of the synchronization module;

one terminal of the sixth capacitor is connected with the input terminal of the second voltage regulation chip, and the other terminal of the sixth capacitor is connected with the ground terminal of the second voltage regulation chip; and one terminal of the seventh capacitor is connected with the output terminal of the second voltage regulation chip, and the other terminal of the seventh capacitor is connected with the ground terminal of the second voltage regulation chip.

9. The digital-analog integrated voltage transformer calibration system according to claim 1, wherein the synchronization module comprises:

a single processor module, having an output terminal connected with an input terminal of a first pulse output module, an input terminal of a second pulse output module, an input terminal of a pulse-per-second output module, and the input terminal of an IRIG-B time synchronization pulse output module, and used for controlling the first pulse output module and the second pulse output module to output a synchronous pulse signal, and controlling the direct-current high voltage generator to output a pulse-per-second signal and an IRIG-B time synchronization pulse signal;

the first pulse output module, having an output terminal connected with the AD conversion module, and used for transmitting the synchronous pulse signal to the AD conversion module;

the second pulse output module, having an output terminal connected with the digital quantity acquisition module, and used for transmitting the synchronous pulse signal to the AD conversion module;

the pulse-per-second output module, having an output terminal connected with the direct-current high voltage generator, and used for transmitting the pulse-per-second signal to the direct-current high voltage generator; and the IRIG-B time synchronization pulse output module, having an output terminal connected with the direct-current high voltage generator, and used for transmitting the IRIG-B time synchronization pulse signal to the direct-current high voltage generator.

10. The digital-analog integrated voltage transformer calibration system according to claim 9, further comprising:

an oven controlled crystal oscillator module, having an output terminal connected with the single processor module, and used for outputting a crystal oscillator frequency to the single processor module to enable the single processor module to control the first pulse output module and the second pulse output module to output a synchronous pulse signal according to the crystal oscillator frequency, and to control the direct-current high voltage generator to output a pulse-per-second signal and an IRIG-B time synchronization pulse signal.

* * * * *